United States Patent
Takasumi

(10) Patent No.: US 9,712,797 B2
(45) Date of Patent: Jul. 18, 2017

(54) IMAGE PROCESSING APPARATUS, IMAGE PICKUP APPARATUS, IMAGE PROCESSING METHOD, AND NON-TRANSITORY COMPUTER-READABLE MEDIUM

(71) Applicant: Olympus Corporation, Hachioji-shi, Tokyo (JP)

(72) Inventor: Shinya Takasumi, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/147,324

(22) Filed: May 5, 2016

(65) Prior Publication Data

US 2016/0249029 A1     Aug. 25, 2016

Related U.S. Application Data

(63) Continuation of application No. PCT/JP2015/059179, filed on Mar. 25, 2015.

(30) Foreign Application Priority Data

Jan. 6, 2015  (JP) ................................ 2015-001054

(51) Int. Cl.
*H04N 9/64* (2006.01)
*G06T 5/00* (2006.01)
(Continued)

(52) U.S. Cl.
CPC .............. *H04N 9/646* (2013.01); *G06T 5/00* (2013.01); *H04N 1/407* (2013.01); *H04N 1/6027* (2013.01); *H04N 1/6077* (2013.01); *H04N 5/243* (2013.01); *H04N 9/045* (2013.01); *H04N 9/643* (2013.01); *H04N 9/648* (2013.01); *H04N 9/68* (2013.01); *H04N 9/735* (2013.01)

(58) Field of Classification Search
CPC ........ H04N 9/646; H04N 9/045; H04N 9/643; H04N 9/648; H04N 9/68; H04N 9/735; H04N 1/407; H04N 1/6027; H04N 1/6077; H04N 5/243; G06T 5/00

USPC ........................................................ 348/254
See application file for complete search history.

(56) References Cited

U.S. PATENT DOCUMENTS 6,781,595 B2 *  8/2004  Kobayashi ........... H04N 1/6005
                                                   345/589
9,444,972 B2 *  9/2016  Saiki .................... H04N 1/407
                          (Continued)

FOREIGN PATENT DOCUMENTS

| JP | 2748678 | 2/1998 |
|----|---------|--------|
| JP | 2002-135584 | 5/2002 |

(Continued)

OTHER PUBLICATIONS

International Search Report to corresponding International Application No. PCT/JP2015/059179, mailed on Jan. 6, 2015 (3 pgs.).

*Primary Examiner* — Pritham Prabhakher
(74) *Attorney, Agent, or Firm* — John C. Pokotylo; Straub & Pokotylo

(57) ABSTRACT

An image processing apparatus includes: a gain calculating portion and a gain multiplication portion that perform signal enhancement with respect to an input image constituted by pixels having a plurality of color signals, with an intensity in accordance with signal values of each pixel, without changing a chroma and a hue; and a gamma correction portion that performs, for each pixel, tone conversion of a plurality of color signals that are subjected to signal enhancement, based on a weak gamma conversion curve in which a degree of gamma enhancement is weaker than in a basic gamma conversion curve which performs conversion such that a signal value of a halftone region at a time of outputting in a case where signal enhancement is not performed becomes a signal value in an appropriate output value range.

9 Claims, 7 Drawing Sheets

(51) Int. Cl.
*H04N 1/407* (2006.01)
*H04N 5/243* (2006.01)
*H04N 9/68* (2006.01)
*H04N 1/60* (2006.01)
*H04N 9/04* (2006.01)
*H04N 9/73* (2006.01)

(56) References Cited

U.S. PATENT DOCUMENTS

| | | | | |
|---|---|---|---|---|
| 2002/0171603 | A1* | 11/2002 | Chen | G06F 1/3203 345/1.1 |
| 2011/0141500 | A1* | 6/2011 | Togami | H04N 1/6002 358/1.9 |
| 2014/0368885 | A1* | 12/2014 | Ido | G03G 15/00 358/3.1 |
| 2015/0098098 | A1* | 4/2015 | Nagai | H04N 1/6027 358/1.9 |
| 2015/0104109 | A1* | 4/2015 | Ichitsubo | H04N 1/4078 382/233 |
| 2015/0160580 | A1* | 6/2015 | Saiki | G06K 15/1825 358/1.1 |

FOREIGN PATENT DOCUMENTS

| | | |
|---|---|---|
| JP | 2006-115444 | 4/2006 |
| JP | 5248928 | 4/2013 |
| JP | 2014-063268 | 4/2014 |

* cited by examiner

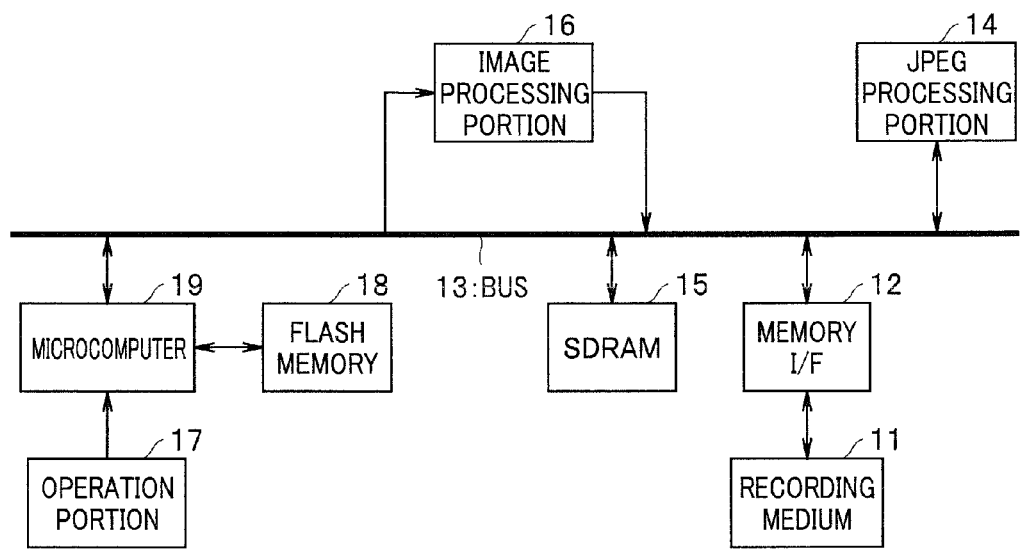
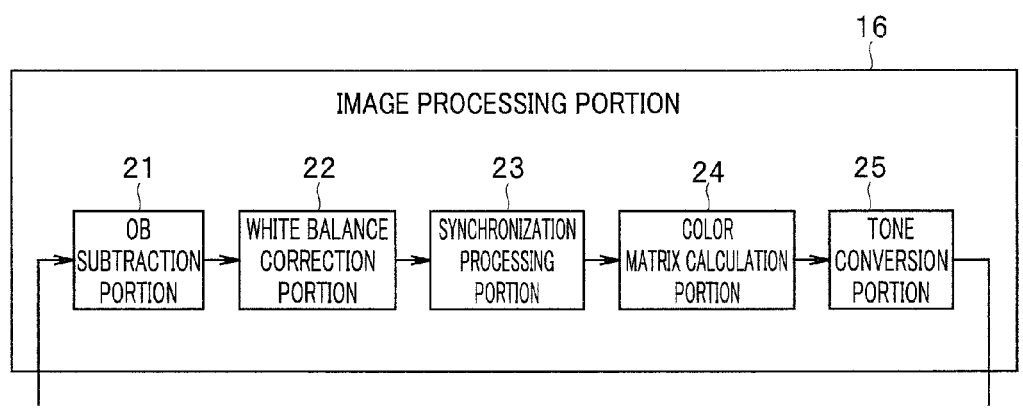

IMAGE PROCESSING APPARATUS, IMAGE PICKUP APPARATUS, IMAGE PROCESSING METHOD, AND NON-TRANSITORY COMPUTER-READABLE MEDIUM

CROSS REFERENCE TO RELATED APPLICATION

This application is a continuation application of PCT/JP2015/059179 filed on Mar. 25, 2015 and claims benefit of Japanese Application No. 2015-001054 filed in Japan on Jan. 6, 2015, the entire contents of which are incorporated herein by this reference.

BACKGROUND OF THE INVENTION

1. Field of the Invention

The present invention relates to an image processing apparatus, an image pickup apparatus, an image processing method and a non-transitory computer-readable medium which perform tone conversion of an image constituted by pixels that have a plurality of color signals.

2. Description of the Related Art

Technology has already been proposed which performs tone conversion with respect to an image obtained by an image pickup operation, so that an image having appropriate tones is displayed on a display apparatus or so that an image having appropriate tones is printed by a printing apparatus.

In a case where an input image is constituted by a plurality of color signals, if tone conversion is performed for each color signal, the chroma and hue will change. This is because gamma conversion is a non-linear conversion, and therefore, for example, if a gamma conversion $\gamma(\ )$ is performed with respect to three primary color signals RGB that are inputted, a pre-conversion color signal ratio R:G:B and a post-conversion color signal ratio $\gamma(R):\gamma(G):\gamma(B)$ generally will not match, and thus the amounts of chroma and hue are not preserved by the gamma conversion $\gamma(\ )$.

Therefore, technology has been proposed which is designed to perform tone conversion of a luminance component, but to suppress changes with respect to the chroma and hue.

For example, according to technology described in Japanese Patent No. 2748678, first, a luminance signal Y is created based on a plurality of color signals R, G and B, and next a correction coefficient K is calculated based on a ratio Y'/Y between the luminance signal Y and a signal Y' obtained by subjecting the luminance signal Y to gamma conversion. Subsequently, color signals R', G' and B' after tone conversion are calculated by multiplying the calculated correction coefficient K by the plurality of color signals R, G and B, respectively. Since a color signal ratio R':G':B' of the color signals R', G' and B' after the tone conversion that were multiplied by the common correction coefficient K in this way is identical to the color signal ratio R:G:B before the tone conversion, the chroma and hue do not change as a result of the tone conversion.

Further, according to technology disclosed in Japanese Patent No. 5248928, an image is divided into a plurality of regions, an average luminance value is calculated for each region, and the higher the average luminance value is, the larger the value to which a dynamic range expansion ratio is set. Further, a tone curve is applied that increases the degree to which a high luminance region is compressed as the dynamic range expansion ratio increases, to thereby amplify the level of an intermediate luminance region. In addition, as the dynamic range expansion ratio becomes larger and the number of high luminance regions increases, at least one amount among a gain correction amount, a diaphragm value correction amount, a shutter speed correction amount and an exposure value correction amount is increased. According to the technology disclosed in the aforementioned Japanese Patent No. 5248928, the dynamic range is expanded in this manner.

A gamma conversion curve (for example, a gamma conversion curve described in the aforementioned Japanese Patent No. 5248928) generally has a shape in which a slope increases as the curve moves to a low luminance region, and in which the slope gradually decreases as the curve moves to a high luminance region. When tone conversion is performed using the kind of gamma conversion curve, a decrease in chroma is liable to arise, in particular, on a high luminance side on which the slope of the gamma conversion curve decreases.

First, in a case where R=G=B, which is the case of an achromatic color, a pre-conversion color signal ratio R:G:B and a post-conversion color signal ratio $\gamma(R):\gamma(G):\gamma(B)$ are each 1:1:1, and are thus equal.

In contrast, in the case of a chromatic color in which a signal value of at least one color signal among the color signals R, G and B is different to the signal values of the other color signals, if tone conversion is performed using the aforementioned gamma conversion curve, although the amplification factor of a color signal having the highest signal value will become a comparatively small value that is close to 1, the amplification factor of a color signal having a low signal value will become significantly greater than 1 and consequently the color signal ratios before and after conversion will not be equal. Accordingly, while both the chroma and hue will change, in relation to the chroma in particular, it is known that the color will approach an achromatic color because the color signal ratio will come close to 1:1:1.

SUMMARY OF THE INVENTION

An image processing apparatus according to a certain aspect of the present invention includes: a signal enhancement portion that performs signal enhancement with respect to an input image constituted by pixels having a plurality of color signals, with an intensity that is in accordance with signal values of each pixel, without changing a chroma and a hue; and a gamma correction portion that performs, for each pixel, tone conversion of a plurality of color signals that are subjected to signal enhancement by the signal enhancement portion, based on a weak gamma conversion curve in which a degree of gamma enhancement is weaker than in a basic gamma conversion curve which performs conversion such that a signal value of a halftone region at a time of outputting in a case where signal enhancement by the signal enhancement portion is not performed becomes a signal value in an appropriate output value range.

An image pickup apparatus according to a certain aspect of the present invention includes: an image pickup optical system that forms an object image; an image pickup portion that picks up the object image that is formed by the image pickup optical system and generates an image signal; and the image processing apparatus that adopts the image signal generated by the image pickup portion as the input image.

An image processing method according to a certain aspect of the present invention includes: a signal enhancement step of performing signal enhancement with respect to an input image constituted by pixels having a plurality of color signals, with an intensity that is in accordance with signal values of each pixel, without changing a chroma and a hue; and a tone conversion step of performing, for each pixel, tone conversion of a plurality of color signals that are subjected to signal enhancement by the signal enhancement step, based on a weak gamma conversion curve in which a degree of gamma enhancement is weaker than in a basic gamma conversion curve which performs conversion such that a signal value of a halftone region at a time of outputting in a case where signal enhancement by the signal enhancement step is not performed becomes a signal value in an appropriate output value range.

A non-transitory computer-readable medium according to a certain aspect of the present invention stores a computer program configured to cause a computer to execute: a signal enhancement step of performing signal enhancement with respect to an input image constituted by pixels having a plurality of color signals, with an intensity that is in accordance with signal values of each pixel, without changing a chroma and a hue; and a tone conversion step of performing, for each pixel, tone conversion of a plurality of color signals that are subjected to signal enhancement by the signal enhancement step, based on a weak gamma conversion curve in which a degree of gamma enhancement is weaker than in a basic gamma conversion curve which performs conversion such that a signal value of a halftone region at a time of outputting in a case where signal enhancement by the signal enhancement step is not performed becomes a signal value in an appropriate output value range.

BRIEF DESCRIPTION OF THE DRAWINGS

FIG. 1 is a block diagram illustrating the configuration of an image processing apparatus in Embodiment 1 of the present invention;

FIG. 2 is a block diagram illustrating the configuration of an image processing portion in the Embodiment 1;

DETAILED DESCRIPTION OF THE PREFERRED EMBODIMENTS

Figure 3:
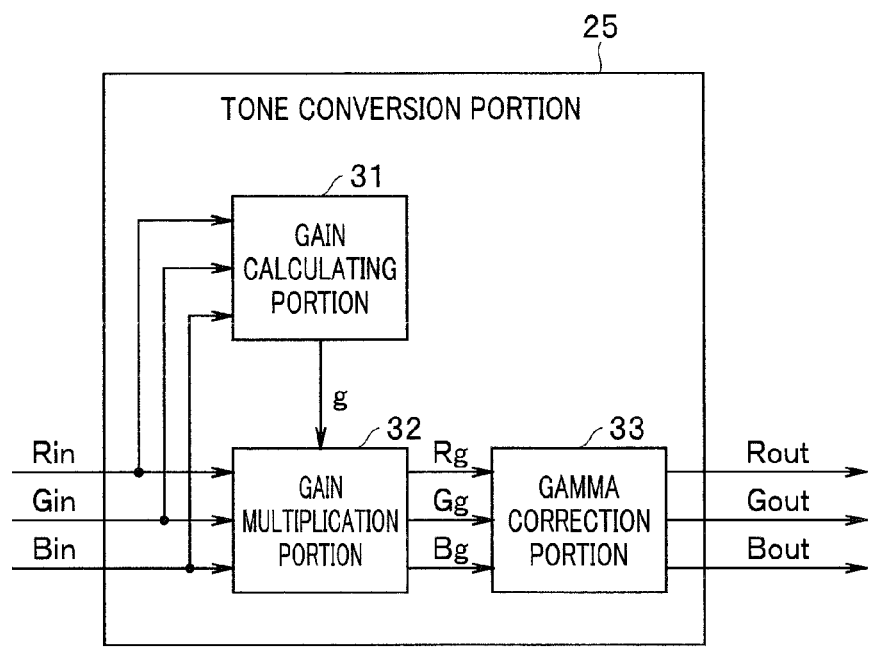
FIG. 3 is a block diagram illustrating the configuration of a tone conversion portion in the embodiment 1.

Hereunder, embodiments of the present invention are described with reference to the accompanying drawings.

Embodiment 1

FIG. 1 to FIG. 11 illustrate Embodiment 1 of the present invention, where FIG. 1 is a block diagram illustrating the configuration of an image processing apparatus.

The image processing apparatus includes, for example, a memory interface (memory I/F) 12, a bus 13, a JPEG processing portion 14, an SDRAM 15, an image processing portion 16, an operation portion 17, a flash memory 18 and a microcomputer 19.

The memory I/F 12 performs operations to read image data from a recording medium 11 and, as required, operations to write image data to the recording medium 11.

Here, it is assumed that color image data constituted by a plurality of color signals picked up by an image pickup apparatus or the like (although RGB signals are assumed in the following description of the present embodiment, the present invention is not limited thereto) is recorded on the recording medium 11 as, for example, RAW image data or JPEG image data that is compressed in accordance with the JPEG compression method. The recording medium 11 is constituted by, for example, a memory card or a disk-shaped recording medium, and is configured so as to be detachably attachable to the memory I/F 12. Therefore, it is not necessary for the recording medium 11 to have a configuration that is specific to the image processing apparatus.

The bus 13 is a transfer path configured to transfer various kinds of data or control signals generated at a certain place inside the image processing apparatus to another place inside the image processing apparatus. The bus 13 according to the present embodiment is connected to the memory I/F 12, the JPEG processing portion 14, the SDRAM 15, the image processing portion 16 and the microcomputer 19.

The JPEG processing portion 14 expands, in accordance with a JPEG expansion method, JPEG image data that is read out through the memory I/F 12 from the recording medium 11, and stores the expanded image data on the SDRAM 15. The JPEG processing portion 14 also performs compression of image data that is processed by the image processing portion 16. In this case also, the JPEG processing portion 14 reads out image data after image processing from the SDRAM 15, and compresses the image data in accordance with the JPEG compression method. The compressed image data is stored on, for example, the recording medium 11 through the memory I/F 12, based on control of the microcomputer 19.

The SDRAM 15 is a storage portion that temporarily stores various kinds of data such as image data as described above. In a case where image data that is read out from the recording medium 11 is non-compressed RAW image data, the image data is stored in the SDRAM 15 via the bus 13 from the memory I/F 12 without undergoing expansion processing by the JPEG processing portion 14.

The image processing portion 16 performs various kinds of image processing on image data that is read out from the SDRAM 15, and stores the processed image data in the SDRAM 15 again. The configuration of the image processing portion 16 is described in detail later referring to FIG. 2.

The operation portion 17 is a portion configured to perform various kinds of operation inputs with respect to the image processing apparatus, and in a case where the image processing apparatus is constituted by, for example, a personal computer, the operation portion 17 is constituted by various input devices such as a keyboard, a mouse and a touch panel. Instructions to start and end image processing, or various settings relating to image processing including tone conversion as described later can be made through the operation portion 17.

The flash memory 18 is a recording medium that non-volatily stores processing programs that are executed by the microcomputer 19, and various kinds of information relating to the image processing apparatus. In this case, various parameters that are required for operation of the image processing apparatus such as a gamma conversion curve that is used in tone conversion processing may be mentioned as an example of information that the flash memory 18 stores. The information that the flash memory 18 stores is read by the microcomputer 19. Note that, although the flash memory 18 is mentioned here as an example, a hard disk or other kind of recording medium may also be used.

The microcomputer 19 is configured as, for example, a CPU, and is a control portion that performs overall control of the image processing apparatus. When a user performs an operation input from the operation portion 17, in accordance with a processing program that is stored in the flash memory 18, the microcomputer 19 reads in parameters required for processing from the flash memory 18 and executes various sequences according to the operation contents.

FIG. 2 is a block diagram illustrating the configuration of the image processing portion 16.

The image processing portion 16 includes an OB subtraction portion 21, a white balance correction portion 22, a synchronization processing portion 23, a color matrix calculation portion 24 and a tone conversion portion 25.

In a case where image data is, for example, RAW image data that includes image data of an effective pixel region and image data of an optical black (OB) region, the OB subtraction portion 21 reduces dark-time noise by subtracting the image data of the OB region from the image data of the effective pixel region. Further, in a case where the image data that is the processing object has already undergone OB subtraction processing, the processing is bypassed.

The white balance correction portion 22 performs processing that adjusts the white balance by adjusting the respective gains of an R component, G component and B component of image data. The configuration that is adopted allows the white balance adjustment to be performed by automatic processing, and to also be performed manually by a user through the operation portion 17.

The synchronization processing portion 23 performs synchronization processing (also referred to as "demosaicing processing") that, for example, converts from image data of a Bayer array in which only one color component among the RGB components is present per pixel to image data in which all pixels include all of the three color components of R, G and B by determining color components that are not present on the pixel of interest by interpolation based on peripheral pixels.

The color matrix calculation portion 24 performs a color matrix calculation on image data after the synchronization processing.

The tone conversion portion 25 performs tone conversion so that, in particular, a signal value of a halftone region becomes a signal value in an appropriate output value range, so that the tone characteristics of the overall image become appropriate.

FIG. 3 is a block diagram that illustrates the configuration of the tone conversion portion 25.

The tone conversion portion 25 includes a gain calculating portion 31, a gain multiplication portion 32 and a gamma correction portion 33.

The gain calculating portion 31 and the gain multiplication portion 32 constitute a signal enhancement portion that performs signal enhancement with respect to an input image constituted by pixels of a plurality of color signals, with an intensity that is in accordance with signal values for each pixel, without changing the chroma or hue.

That is, the gain calculating portion 31 calculates a gain g based on signal values of color signals Rin, Gin and Bin that are inputted for each pixel.

The gain multiplication portion 32 multiplies the respective color signals Rin, Gin and Bin that are inputted for each pixel by a gain g that is calculated for the relevant pixel by the gain calculating portion 31, and outputs color signals Rg, Gg and Bg obtained following the gain multiplication.

The gamma correction portion 33 subjects the inputted color signals Rg, Gg and Bg to tone conversion based on a gamma conversion curve that represents tone conversion characteristics, and outputs color signals Rout, Gout and Bout.

Operations of the tone conversion portion 25 will now be described in detail referring to FIG. 4 to FIG. 7.

Figure 4:
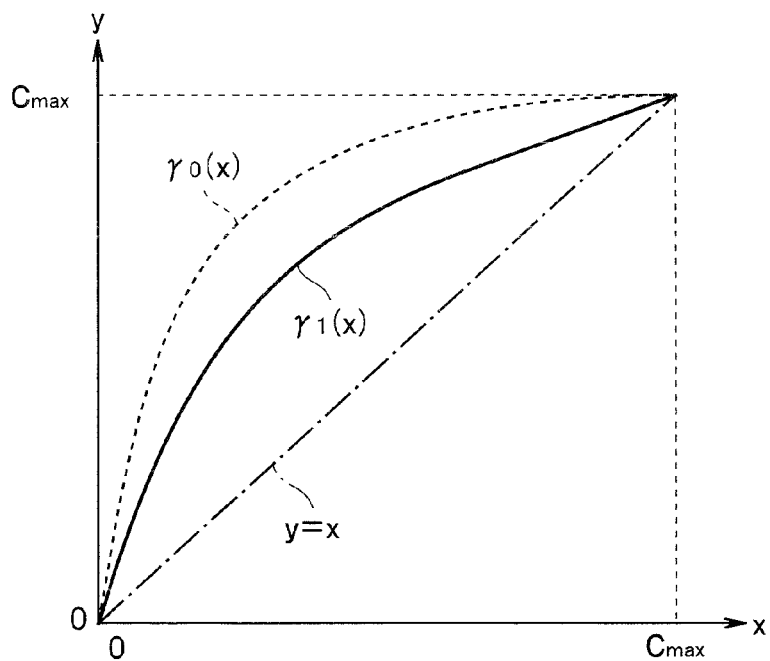
FIG. 4 is a chart illustrating an example of a basic gamma conversion curve γ0(x) and a weak gamma conversion curve γ1(x) in the embodiment 1.

First, FIG. 4 is a chart that illustrates an example of a basic gamma conversion curve $\gamma 0(x)$ and a weak gamma conversion curve $\gamma 1(x)$.

Tone conversion is generally a process that, without changing the dynamic range of a signal, converts an input signal of a certain signal value to an output signal of another signal value. Here, although a configuration may also be adopted that, in the tone conversion, changes the dynamic range of an input signal and the dynamic range of an output signal, the processing at such time is no more than processing for tone conversion and processing for dynamic range expansion (or dynamic range contraction) that are performed simultaneously, and therefore, with respect to processing for purely performing tone conversion, it is sufficient to consider a case in which the dynamic range is not changed (if the dynamic range is changed, such processing can be performed separately from processing for tone conversion).

Therefore, in FIG. 4, it is assumed that an identical closed interval [0, Cmax] applies with respect to a dynamic range of an input signal shown on an x-axis and a dynamic range of an output signal shown on a y-axis. In this case, a lower limit value of each dynamic range is 0, and an upper limit value is Cmax (0<Cmax). As a specific example, in the case of a 10-bit signal having signal values of 0 to 1023, the upper limit value Cmax of each dynamic range is 1023.

The basic gamma conversion curve $\gamma 0(x)$ shown in FIG. 4 is a curve for performing tone conversion of color signals Rin, Gin and Bin that are inputted to the tone conversion portion 25 to color signals Rout, Gout and Bout having appropriate tones (as described above, particularly, so that signal values in a halftone region become signal values in an appropriate output value range). Here, a variable "x" represents an input signal value.

The basic gamma conversion curve $\gamma 0(x)$ is a curve that takes a closed interval [0, Cmax] as the domain of definition, and in substantially the same manner as a common gamma conversion curve, satisfies the respective properties shown in the following expressions 1 and 2, and the respective properties shown in the following expressions 3 and 4 in an open interval (0, Cmax) (however, more precisely, expression 3 is satisfied in a half-open interval [0, Cmax)).

$$\gamma 0(0)=0 \quad [\text{Expression 1}]$$

$$\gamma 0(C\text{max})=C\text{max} \quad [\text{Expression 2}]$$

$$\gamma 0'(x)>0 \quad [\text{Expression 3}]$$

$$\gamma 0''(x)<0 \quad [\text{Expression 4}]$$

Here, the symbol ' denotes a first-order derivative, and the symbol '' denotes a second-order derivative.

Expressions 1 and 2 indicate a boundary condition of the basic gamma conversion curve $\gamma 0(x)$, more specifically, a boundary condition whereby a dynamic range of a signal is not changed by tone conversion (for example, a situation does not arise in which a dynamic range of 0 to 1023 is restricted to a dynamic range of 100 to 900). Further, expression 3 indicates that an inversion does not arise in the magnitude relation between signal values (no negative slope portion exists on the curve, and the magnitude relation between the signal values in input signals is also maintained in the output signals). In addition, expression 4 indicates that the basic gamma conversion curve $\gamma 0(x)$ is a curve that has a shape that is upwardly convex, and which has a conversion characteristic that raises a signal value of a halftone region.

Since the basic gamma conversion curve $\gamma 0(x)$ passes through the origin (0, 0) and a point (Cmax, Cmax) and is upwardly convex, in the open interval (0, Cmax) the basic gamma conversion curve $\gamma 0(x)$ is above a straight line y=x that indicates no conversion, and furthermore, because the slope is positive, the basic gamma conversion curve $\gamma 0(x)$ is below y=Cmax (that is, x<$\gamma 0(x)$<Cmax). Thus, it is found that the basic gamma conversion curve $\gamma 0(x)$ satisfies required conditions with respect to the dynamic range of an output signal for an intermediate value other than the boundary conditions shown in expressions 1 and 2, and has the closed interval [0, Cmax] as a value range.

Figure 5:
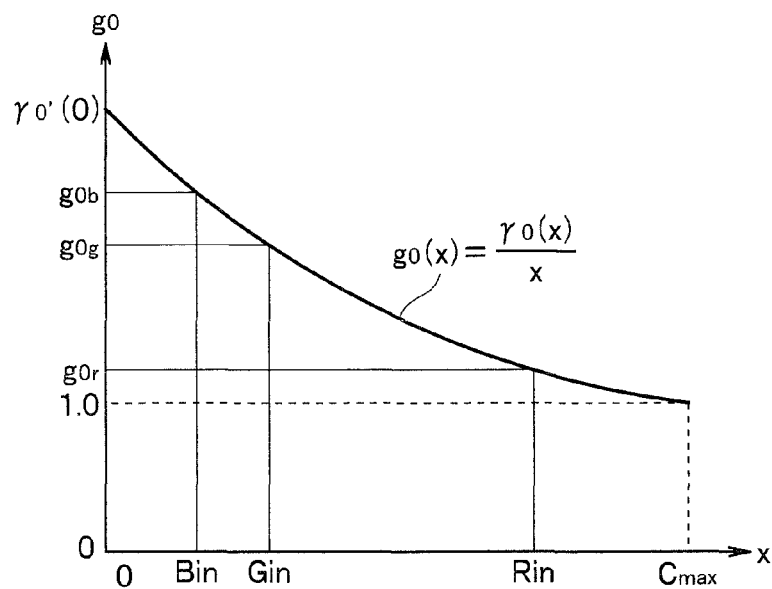
FIG. 5 is a view illustrating an example of a gain of respective color signals when signals of a chromatic color are subjected to tone conversion using a basic gamma conversion curve γ0(x) in the embodiment 1.

FIG. 5 is a view illustrating an example of gains of each color signal when signals of a chromatic color are subjected to tone conversion using the basic gamma conversion curve $\gamma 0(x)$. Here, the signals of the chromatic color are signals in which, among a plurality of color signals (in this case, RGB signals), at least one color signal takes a signal value that is different to the other color signals.

FIG. 5 illustrates an example in which the signal values of the color signals are values such that Rin>Gin>Bin (that is, an example in which a red color component is the strongest signal).

A gain $g0(x)$ according to the basic gamma conversion curve $\gamma 0(x)$ is represented by a proportion of an output signal value $\gamma 0(x)$ with respect to an input signal value x, as shown in the following expression 5.

$$g0(x)=\gamma 0(x)/x \quad [\text{Expression 5}]$$

Further, because the basic gamma conversion curve $\gamma 0(x)$ is an upwardly concave curve that satisfies the expressions 1 to 4, the gain $g0(x)$ is a function that monotonously decreases as shown in FIG. 5, and is a function such that the gain becomes 1 at the upper limit value Cmax of the dynamic range because the input value and output value at the upper limit value Cmax of the dynamic range match as shown in expression 2 (note that, although the input value and the output value match and become 0 at the lower limit of the dynamic range also, because the gain becomes $\gamma 0'(0)$ that is determined as a limit value, the gain becomes a value greater than 1).

In the case of a gain $g0(x)$ as shown in FIG. 5, it is found that because the color signal Bin having the smallest signal value is amplified by the highest gain $g0b=g0(\text{Bin})$, and the color signal Rin having the largest signal value is amplified by the lowest gain $g0r=g0(\text{Rin})$ and the ratio between the color signals approaches 1, the chroma decreases (note that an intermediate color signal Gin is amplified by an intermediate gain $g0g=g0(\text{Gin})$; further, generally the hue also changes somewhat).

Therefore, in the present embodiment, the tone conversion portion 25 is configured as follows.

First, a weak gamma conversion curve $\gamma 1(x)$ in which the degree of gamma enhancement is weaker than the basic gamma conversion curve $\gamma 0(x)$ that described above is set as a curve that satisfies at least the respective properties shown in expressions 6 and 7, and the respective properties shown in expressions 8 to 10 in an open interval (0, Cmax) (similarly to the aforementioned expression 3, more exactly, the weak gamma conversion curve $\gamma 1(x)$ is set as a curve in which expression 8 is satisfied in a half-open interval [0, Cmax)).

$$\gamma 1(0)=0 \quad [\text{Expression 6}]$$

$$\gamma 1(C\text{max})=C\text{max} \quad [\text{Expression 7}]$$

$$\gamma 1'(x)>0 \quad [\text{Expression 8}]$$

$$\gamma 1''(x)<0 \quad [\text{Expression 9}]$$

$$\gamma 0(x)>\gamma 1(x)>x \quad [\text{Expression 10}]$$

Here, expressions 6 to 9 indicate that the weak gamma conversion curve $\gamma 1(x)$ satisfies the same respective properties as the properties of the basic gamma conversion curve $\gamma 0(x)$ shown in expressions 1 to 4.

Further, expression 10 indicates that the degree of gamma enhancement of the weak gamma conversion curve $\gamma 1(x)$ is weaker than the basic gamma conversion curve $\gamma 0(x)$. In this case, the term "curve in which the degree of gamma enhancement is weak" refers to a curve that is closer to the straight line y=x that indicates no conversion.

Figure 6:
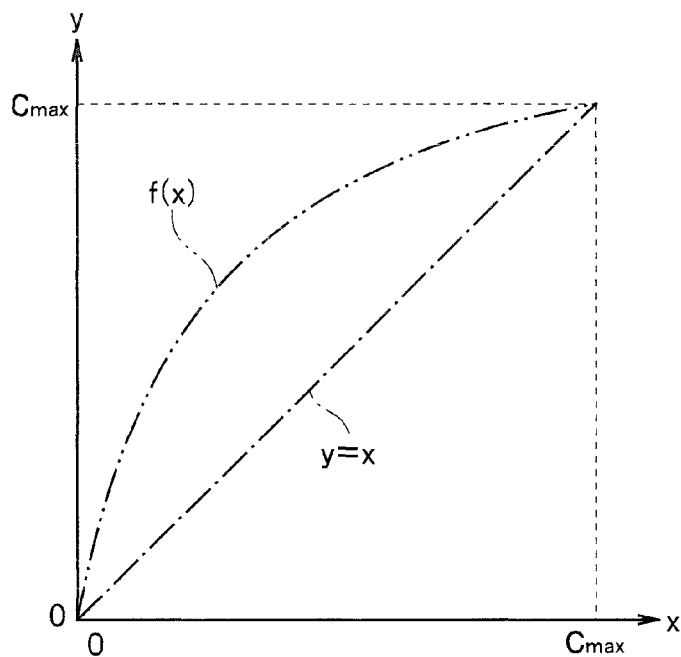
FIG. 6 is a chart illustrating the shape of a function f(x) in the embodiment 1.

As shown in the following expression 11, the basic gamma conversion curve $\gamma 0(x)$ is broken up into a composite function of a weak gamma conversion curve $\gamma 1(x)$ as shown in FIG. 4 and a function f(x) as shown in FIG. 6.

$$\gamma 0(x)=\gamma 1(f(x))=\gamma 1 \cdot f(x) \quad [\text{Expression 11}]$$

Here, the symbol "·" denotes a composite function. Further, FIG. 6 is a chart illustrating the function shape of the function f(x).

In this case, the function f(x) is calculated as shown in the following expression 12 based on the basic gamma conversion curve $\gamma 0(x)$ as shown in FIG. 4 and the weak gamma conversion curve $\gamma 1(x)$.

$$f(x)=\gamma 1\hat{}(-1) \cdot \gamma 0(x) \quad [\text{Expression 12}]$$

Here, the symbol "$\hat{}(-1)$" denotes an inverse function.

Thus, the shape of the function f(x) is determined so that, after the input signal value x is converted by the function f(x), and is further converted by the weak gamma conversion curve $\gamma 1(x)$, a result is obtained that is identical to a result obtained when the input signal value x is converted by the basic gamma conversion curve $\gamma 0(x)$.

The function f(x) satisfies each of the following properties.

First, when x=0, the left side of expression 11 becomes 0 based on expression 1. On the other hand, because the weak gamma conversion curve $\gamma 1(x)$ is a monotonously increasing function as indicated by expression 8, the only time that $\gamma 1(x)=0$ in the closed interval [0, Cmax] is when x=0 that is shown in expression 6. Accordingly, the function f(x) satisfies the property of the following expression 13.

$$f(0)=0 \quad \text{[Expression 13]}$$

Likewise, when x=Cmax, the left side of expression 11 becomes Cmax based on expression 2. On the other hand, because of the monotonously increasing characteristic of the weak gamma conversion curve γ1(x), the only time that γ1(x)=Cmax in the closed interval [0, Cmax] is when x=Cmax that is shown in expression 7. Accordingly, the function f(x) satisfies the property of the following expression 14.

$$f(C\text{max})=C\text{max} \quad \text{[Expression 14]}$$

Further, since γ0(x)>γ1(x) based on expression 10 and, as shown in expression 8, γ1(x) is a monotonously increasing function, y such that γ0(x)=γ1(y) must be greater than x, and referring to expression 11 it is found that the function f(x) satisfies the property of the following expression 15 in the open interval (0, Cmax).

$$f(x)>x \quad \text{[Expression 15]}$$

In addition, a fact that a derived function f'(x) of the function f(x) is a monotonously increasing function that satisfies a property shown in the following expression 16 in an open interval (0, Cmax) will now be described.

$$f'(x)>0 \quad \text{[Expression 16]}$$

In this case also, if it is assumed that an interval in which f'(x)≤0 exists inside the open interval (0, Cmax), that is, an interval exists in which the slope of the function f(x) becomes 0 or negative, because γ1'(x) is a monotonously increasing function in a narrow sense as shown in expression 8, when using a positive minute amount Δx, it means that x exists that satisfies the following expression 17.

$$\gamma 1(f(x+\Delta x)) \leq \gamma 1(f(x)) \quad \text{[Expression 17]}$$

Because the left side of expression 17 is γ0(x+Δx), and the right side is γ0(x), it means that a monotonously decreasing interval in a broad sense is present in the basic gamma conversion curve γ0(x), and this contradicts the definition shown in expression 3. Accordingly, it is found that the derived function f'(x) of the function f(x) satisfies expression 16.

In addition, it is assumed that the weak gamma conversion curve γ1(x) is set so that a function g(x) obtained by dividing the function f(x) by x as shown in the following expression 18 (note that the function g(x) is a function that applies a gain when the input signal value x is converted by the function f(x)) becomes monotonously decreasing in the open interval (0, Cmax).

$$g(x)=f(x)/x \quad \text{[Expression 18]}$$

For example, when the exponent is represented by the symbol "^", and it is taken that 0<p0<p1<1, one example of the weak gamma conversion curve γ1(x) when the basic gamma conversion curve γ0(x) is x^(p0) is as shown in the following expression 19.

$$\gamma_1(x)=x^{\wedge}(p1) \quad \text{[Expression 19]}$$

At this time, the function g(x) is as shown in the following expression 20, and a derived function g'(x) is as shown in the following expression 21.

$$g(x)=f(x)/x=x^{\wedge}\{(p0/p1)-1\} \quad \text{[Expression 20]}$$

$$g'(x)=\{f(x)/x\}'$$
$$=\{(p0/p1)-1\}x^{\wedge}\{(p0/p1)-2\} \quad \text{[Expression 21]}$$

In the expression 21, because {(p0/p1)−1}<0, it is found that the function g(x)=f(x)/x is monotonously decreasing.

Thus, because the conditions of expressions 6 to 10 that are imposed on the weak gamma conversion curve γ1(x) are comparatively moderate, within a range that satisfies these conditions, a weak gamma conversion curve γ1(x) can be further selected so that the function g(x)=f(x)/x becomes a monotonously decreasing function.

The gain calculating portion 31 calculates a gain g in the following manner using the function f(x). That is, first, the gain calculating portion 31 calculates a largest signal value Cin among the color signals Rin, Gin and Bin that are inputted in pixel units. Next, the gain calculating portion 31 calculates the gain g by means of the following expression 22 obtained by substituting the calculated largest signal value Cin into expression 18, and outputs the calculated gain g to the gain multiplication portion 32.

$$g=f(Cin)/Cin \quad \text{[Expression 22]}$$

As will be understood by referring to expression 15, the gain g that is calculated by the above expression 22 takes a value larger than 1 in the open interval (0, Cmax).

The gain multiplication portion 32 multiplies each of the inputted color signals Rin, Gin and Bin by the same gain g that is inputted from the gain multiplication portion 32 as shown in the following expression 23, to thereby calculate color signals Rg, Gg and Bg after gain multiplication.

$$Rg=g \times Rin$$
$$Gg=g \times Gin$$
$$Bg=g \times Bin \quad \text{[Expression 23]}$$

Figure 7:
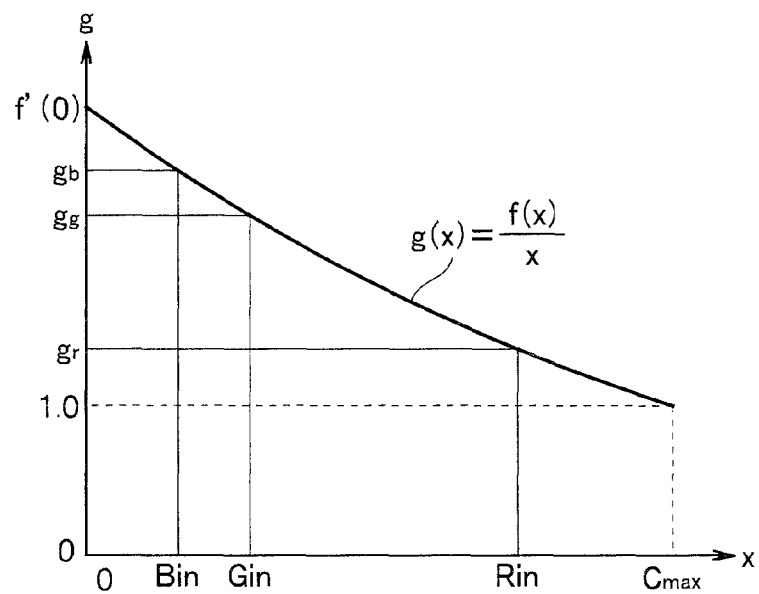
FIG. 7 is a chart illustrating an example of a gain that is calculated for respective color signals using the function f(x) in the embodiment 1.

In this case, if gains gr, gg and gb were calculated for the respective color signals Rin, Gin and Bin using the function f(x), the resultant values will be different to each other as shown in FIG. 7, and this will cause the chroma and hue to change. FIG. 7 is a chart illustrating an example of gains that are calculated for the respective color signals using the function f(x).

In contrast, according to the gain multiplication processing by the gain multiplication portion 32 as shown in expression 23, because the pre-processing color signal ratio Rin:Gin:Bin and the post-processing color signal ratio Rg:Gg:Bg are equal, the chroma and hue do not change.

Thereafter, tone conversion as shown in the following expression 24 is performed by the gamma correction portion 33 based on the weak gamma conversion curve γ1(x) illustrated in FIG. 4.

$$Rout=\gamma 1(Rg)$$
$$Gout=\gamma 1(Gg)$$
$$Bout=\gamma 1(Bg) \quad \text{[Expression 24]}$$

In this case, a result γ1(f(x)) that is obtained after converting the input signal value x by means of the function f(x), and furthermore converting the conversion result using the weak gamma conversion curve γ1( ) is equal to a result γ0(x) obtained by only converting the input signal value x using the basic gamma conversion curve γ0( ) as illustrated in expression 11. In this respect, in a case where the respective color signals Rin, Gin and Bin are multiplied as shown in expression 23 by the gain g that is calculated as shown in expression 22 based on the largest signal value Cin, the situation with respect to a color signal Xin having a signal value that is not the largest value (Xin is any of Rin, Gin and Bin, and satisfies the relation Xin<Cin) is as follows.

First, the relation shown in the following expression 25 holds because the function g(x) that applies a gain according to the function f(x) is a monotonously decreasing function as described above.

$$g=f(Cin)/Cin<f(Xin)/Xin \quad \text{[Expression 25]}$$

Accordingly, as shown in the following expression 26, the resulting value is smaller when the input value Xin is multiplied by the gain g that when the input value Xin is converted by the function f(x).

$$f(Xin)=\{f(Xin)/Xin\}\times Xin>\{f(Cin)/Cin\}\times Xin=g\times Xin \quad \text{[Expression 26]}$$

Because the weak gamma conversion curve γ1 is a monotonously increasing function as shown in expression 8, when f(Xin)>g×Xin, the following expression 27 holds.

$$\gamma 0(Xin)=\gamma 1(f(Xin))>\gamma 1(g\times Xin) \quad \text{[Expression 27]}$$

Accordingly, with regard to the gain of the color signal Xin that does not have the largest signal value, it is found that when the processing of expression 23 and expression 24 is performed, a resulting value is less than a value obtained when only the processing of the basic gamma conversion curve is performed, and a change caused in the chroma (and hue) is suppressed.

Figure 8:
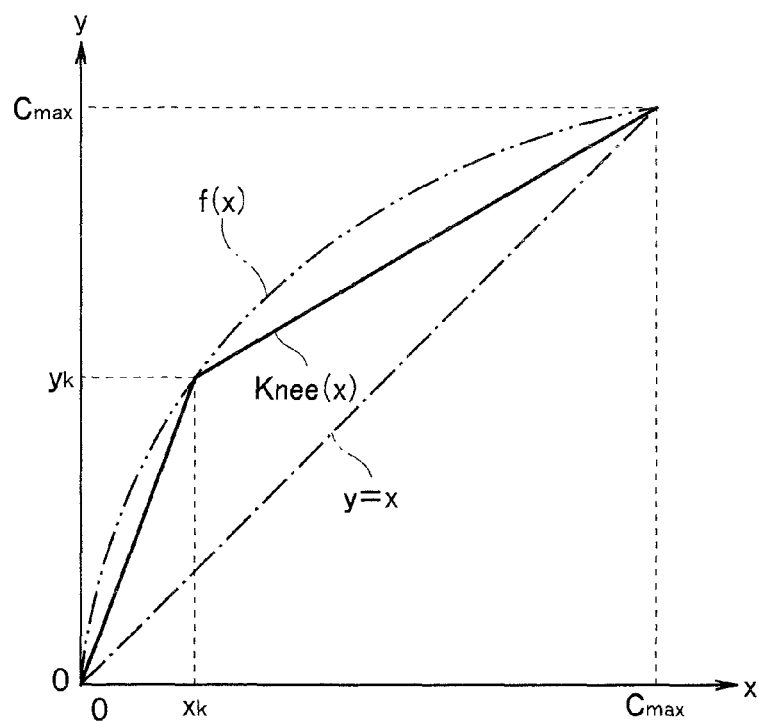
FIG. 8 is a chart illustrating the shape of a function Knee(x) that is an approximation of the function f(x) in the embodiment 1.

Note that, as a modification with regard to calculating of the gain g by the gain calculating portion 31, a function Knee(x) illustrated in FIG. 8 may be used instead of using the function f(x) illustrated in FIG. 6. FIG. 8 is a chart that illustrates the shape of the function Knee(x) that is an approximation of the function f(x).

The function Knee(x) is a function obtained by approximating the function f(x) in a polygonal line shape. Although an example is illustrated here in which a bending point (xk, yk) lies on the function f(x), a polygonal line having a shape obtained by, for example, applying a least squares approximation to the function f(x) (a bending point in this case will generally be at a separated position that is above the function f(x)) may be adopted, or a polygonal line that is approximated to the function f(x) by another appropriate technique may also be adopted. Furthermore, although in this case a polygonal line which has only one bending point is adopted, a polygonal line which has a plurality of bending points may be adopted.

Figure 9:
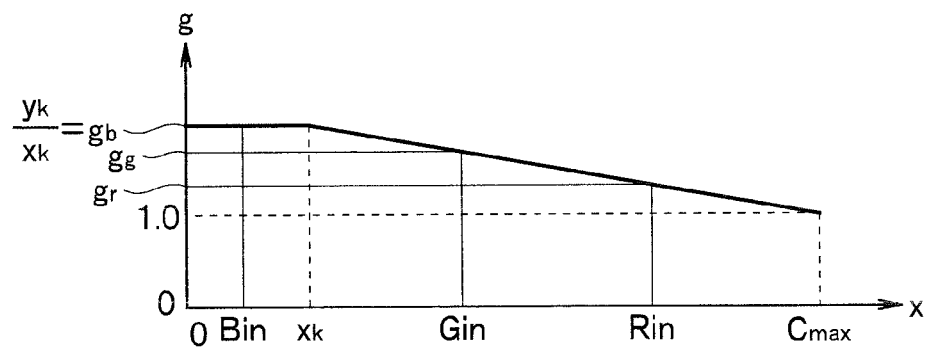
FIG. 9 is a chart illustrating changes in a gain g relative to an input signal value x when using the function Knee(x) in the embodiment 1.

FIG. 9 is a chart illustrating changes in the gain g with respect to the input signal value x when the function Knee(x) is used.

When the function Knee(x) is used, because the gain g changes rectilinearly as illustrated, the gain calculating portion 31 can calculate the gain g with respect to an arbitrary input signal value x by a simple calculation. Accordingly, the modification illustrated in FIG. 8 and FIG. 9 has the advantage of providing a high level of practicality with respect to an image processing apparatus in which high-speed processing is required, or in an image processing apparatus equipped with the microcomputer 19 in which the processing capacity is low (for example, in an image processing apparatus applied to an image pickup apparatus as described later referring to FIG. 12, in some cases the processing capacity is lower than in an image processing apparatus constituted by a personal computer or the like).

Figure 10:
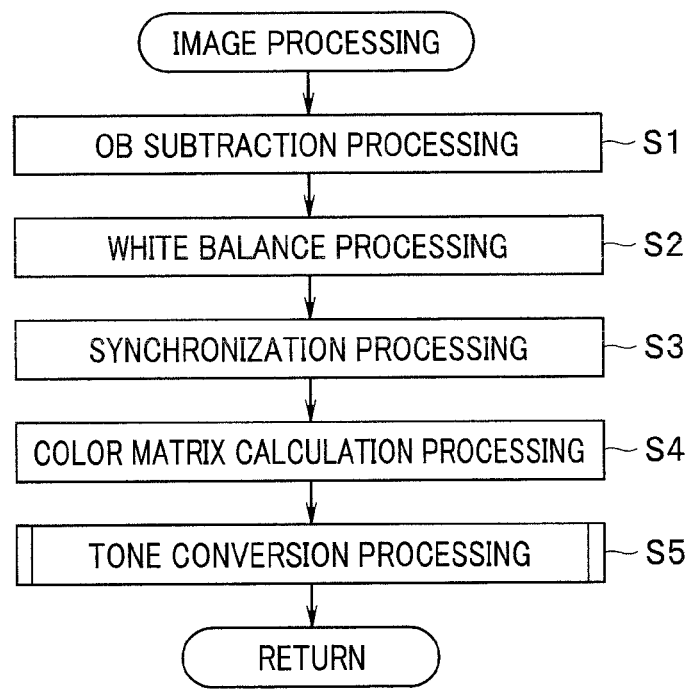
FIG. 10 is a flowchart illustrating image processing performed by the image processing apparatus of the embodiment 1.

FIG. 10 is a flowchart illustrating image processing in the image processing apparatus.

When the processing is started based on control of the microcomputer 19, the OB subtraction portion 21 performs OB subtraction processing that subtracts image data of an OB region from image data of an effective pixel region (step S1).

Next, the white balance correction portion 22 performs white balance correction that adjusts a gain of each color component so that a white portion appears white (step S2).

In addition, the synchronization processing portion 23 performs synchronization processing that interpolates color components that are not present in the pixel of interest (step S3).

The color matrix calculation portion 24 then performs a color matrix calculation on the image data after the synchronization processing (step S4).

Thereafter, the tone conversion portion 25 performs tone conversion processing as described later referring to FIG. 11 (step S5), and returns from the processing to main processing that is not illustrated in the drawings.

Figure 11:
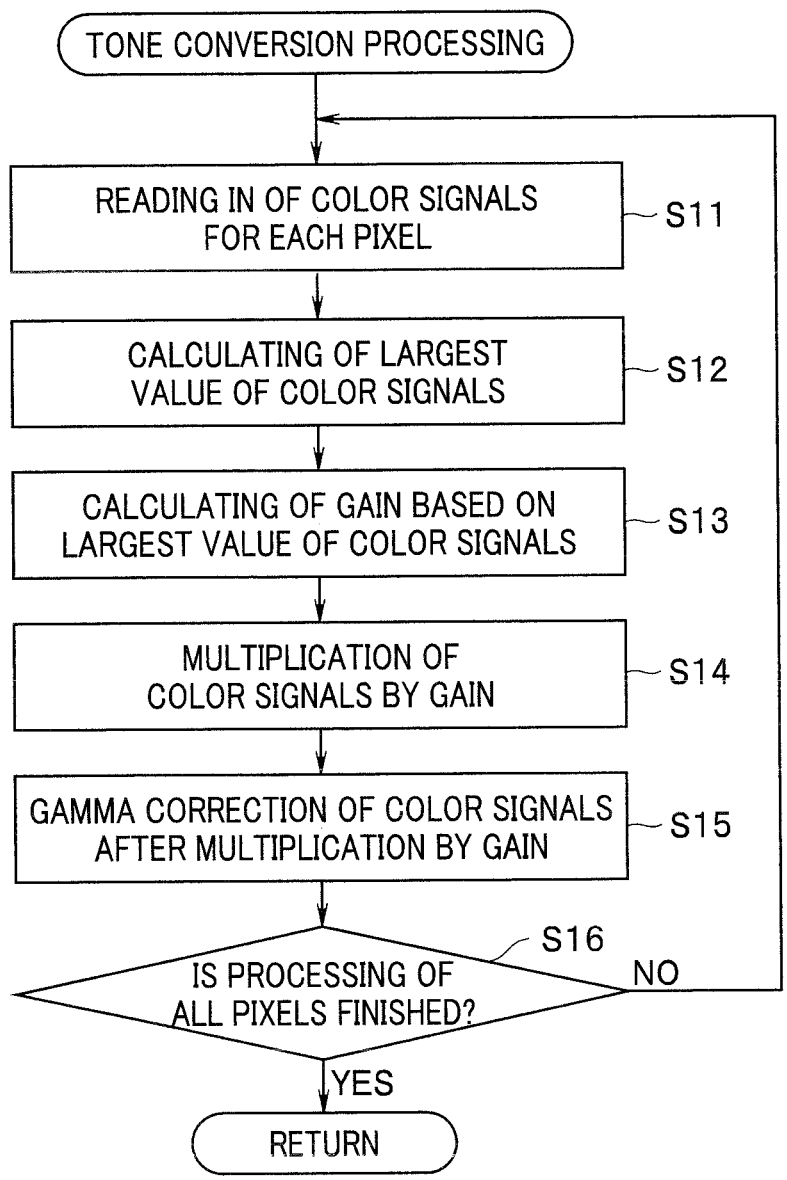
FIG. 11 is a flowchart illustrating tone conversion processing performed by the image processing apparatus of the embodiment 1.

FIG. 11 is a flowchart illustrating tone conversion processing performed in the image processing apparatus. This tone conversion processing is mainly performed by the tone conversion portion 25 based on control of the microcomputer 19.

Upon entering this processing, the tone conversion portion 25 reads in color signals Rin, Gin and Bin for each pixel, that is, the respective pixels constituting the image data are sequentially set as the pixel of interest, and the tone conversion portion 25 reads in the color signals Rin, Gin and Bin of the pixel of interest that is set (step S11).

The gain calculating portion 31 then calculates a largest signal value Cin among the color signals Rin, Gin and Bin that are read in (step S12).

In addition, the gain calculating portion 31 calculates a gain g based on the largest signal value Cin as shown in the above described expression 22, and outputs the calculated gain g to the gain multiplication portion 32 (step S13).

The gain multiplication portion 32 multiplies each of the inputted color signals Rin, Gin and Bin by the same gain g that is inputted from the gain multiplication portion 32 as shown in the above described expression 23, to thereby calculate color signals Rg, Gg and Bg after gain multiplication (step S14). At this time, as described above, the chroma and hue of the color signals Rg, Gg and Bg after the processing do not change from the chroma and hue before the processing.

Next, the gamma correction portion 33 performs a tone conversion as shown in the above described expression 24, based on the weak gamma conversion curve γ1(x) in which, as illustrated in FIG. 4, the degree of gamma enhancement is weaker than in the basic gamma conversion curve γ0(x) (step S15). At this time, as described above, a change in the chroma or hue can be suppressed more than when using the basic gamma conversion curve γ0(x).

Thereafter, it is determined whether or not processing is finished for all pixels constituting the image data (step S16). If processing is not completed for all pixels, the operation returns to step S11 to perform the processing as described above for the next pixel.

If it is determined in step S16 that processing is finished for all pixels, the operation returns from the processing to the processing illustrated in FIG. 10.

According to Embodiment 1 configured as described above, because a configuration is adopted in which, after performing signal enhancement with respect to an input image without changing the chroma and hue, a plurality of color signals are subjected to tone conversion based on the weak gamma conversion curve γ1(x) in which the degree of gamma enhancement is weaker than the basic gamma conversion curve γ0(x), a decrease in chroma in a high-luminance tone region can be suppressed without, as much as possible, decreasing color reproduction in a low-luminance tone region and a halftone region.

At such time, since the signal enhancement portion is configured so as to perform signal enhancement with an intensity that is in accordance with the signal values of each pixel, more specifically, so as to calculate a gain corresponding to a color signal that takes a largest signal value among a plurality of color signals for each pixel and to apply the calculated gain to all the color signals of the relevant pixel, it is possible to prevent the occurrence of a situation in which a color signal after signal enhancement exceeds a color reproduction region.

In addition, since the signal enhancement portion performs signal enhancement by means of the gain g that is calculated as illustrated in expression 22 based on the function f(x) having a property such that f(x)/x that satisfies expressions 13, 14 and 16 monotonously decreases, the dynamic range of each color signal is not narrowed.

Furthermore, since the function f(x) that is calculated as shown in expression 12 is used, an output signal from the tone conversion portion 25 can be made a signal of a low-luminance tone region or a halftone region with appropriate color reproduction, in a substantially similar manner to a case where tone conversion is performed using the basic gamma conversion curve γ0(x).

Embodiment 2

Figure 12:
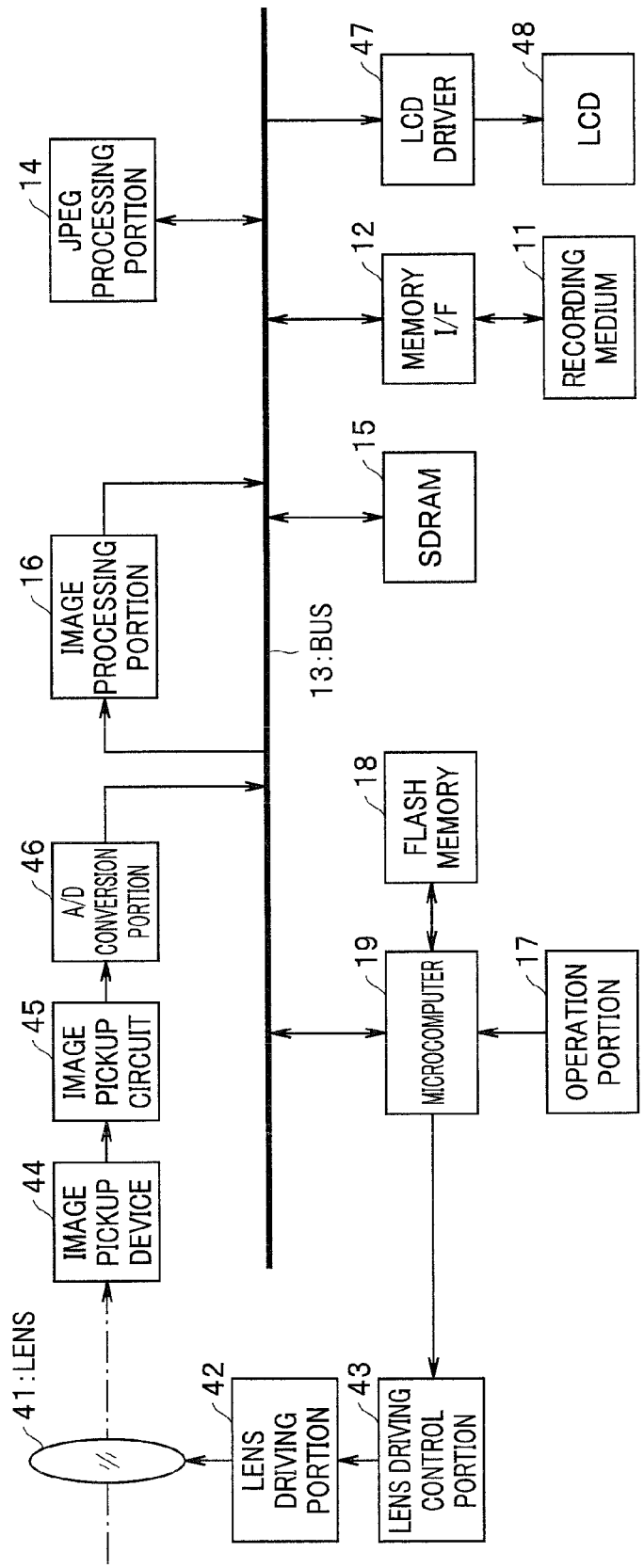
FIG. 12 is a block diagram illustrating the configuration of an image pickup apparatus in Embodiment 2 of the present invention.

FIG. 12 illustrates Embodiment 2 of the present invention, and is a block diagram showing the configuration of an image pickup apparatus. In Embodiment 2, components that are the same as in the above described Embodiment 1 are denoted by the same reference numerals or the like and description of the components is omitted as appropriate, and mainly only differences relative to Embodiment 1 are described.

In the present embodiment, the image processing apparatus of Embodiment 1 that is described above is applied to an image pickup apparatus such as a digital camera.

That is, in addition to the configuration of the image processing apparatus illustrated in FIG. 1, the image pickup apparatus of the present embodiment also includes a lens 41, a lens driving portion 42, a lens driving control portion 43, an image pickup device 44, an image pickup circuit 45, and A/D conversion portion 46, an LCD driver 47 and an LCD 48.

The lens 41 is an image pickup optical system configured to form an object image on the image pickup device 44, and is equipped with a focusing lens and a diaphragm and the like.

The lens driving portion 42 drives the focusing lens of the lens 41 to adjust the focus, and drives the diaphragm of the lens 41 to change the aperture diameter.

The lens driving control portion 43 controls the lens driving portion 42 to cause the lens driving portion 42 to drive the lens 41, based on a command from the microcomputer 19.

The image pickup device 44 is an image pickup portion having a plurality of pixels arrayed in a two-dimensional shape. The image pickup device 44 picks up an image of an object that is formed by the lens 41 and generates an analog image signal. The image pickup device 44 of the present embodiment is configured as, for example, a single-plate type image pickup device in which color filters of a primary color Bayer array are disposed on the front face of a plurality of pixels arrayed in a two-dimensional shape. Note that, naturally the image pickup device 44 is not limited to a single-plate type image pickup device, and for example may be an image pickup device that is laminated so as to separate color components in the substrate thickness direction.

The image pickup circuit 45 performs processing such as amplifying an analog image that is read out from the image pickup device 44, based on an ISO speed that is set.

The A/D conversion portion 46 subjects an analog image that is processed by the image pickup circuit 45 to A/D conversion into a digital image.

Thus, the image processing apparatus that is applied to the image pickup apparatus forms an input image from an image signal that is generated by the image pickup device 44 as the image pickup portion.

Further, the LCD driver 47 drives the LCD 48 so as to display an image or the like, based on control of the microcomputer 19.

The LCD 48 is a monitor that displays an image that is picked up by the image pickup apparatus, and also displays operation menus and various kinds of information and the like relating to the image pickup apparatus.

The microcomputer 19 in the above described configuration functions as an exposure condition setting portion that, based on an image signal that is outputted from the image pickup device 44, calculates appropriate exposure conditions that include: an exposure time period when the image pickup device 44 performs an image pickup operation, a diaphragm value of the lens 41, and an ISO speed corresponding to an amplification factor of an image signal that is outputted from the image pickup device 44. In a case where the ISO speed is less than a predetermined value, the microcomputer 19 sets the appropriate exposure conditions that are calculated, while if the ISO speed is equal to or greater than the predetermined value, the microcomputer 19 sets exposure conditions (so-called, underexposure conditions) in which halation is suppressed more than in the appropriate exposure conditions that are calculated. This is because, for example, in the case of an object which has a large number of dark portions in the entire image, such as in a night scene, luminance difference between a dark part and a bright part that is being illuminated is large, and the bright part is liable to be subjected to halation.

Accordingly, when the ISO speed is equal to or greater than a predetermined value, that is, when the luminance of an object is dark to a degree that requires sensitization, the tone conversion portion 25 performs tone conversion so as to raise a halftone region of an image that is underexposed. By this means, the tone can be expressed while preventing halation of a high luminance region, and a halftone region and a low luminance region can be observed with a more appropriate brightness.

Note that, although in the foregoing description it is described that whether or not to suppress halation is determined based on the ISO speed, a configuration may also be adopted in which, instead of the ISO speed, whether or not to suppress halation is determined based on a luminance histogram. In such a case, the microcomputer 19 functions as an exposure condition setting portion, and first, based on an image signal that is outputted from the image pickup device 44, calculates appropriate exposure conditions including an exposure time period when the image pickup device 44 performs an image pickup operation and a diaphragm value of the lens 41. The microcomputer 19 then calculates a luminance histogram for the object, and in a case where it is determined that the proportion of a halation portion of the object that is based on the calculated luminance histogram is less than a predetermined value, the microcomputer 19 sets the appropriate exposure conditions that are calculated, while if it is determined that the proportion of the halation portion is equal to or greater than the predetermined value, the microcomputer 19 sets exposure conditions in which halation is suppressed more than in the calculated appropriate exposure conditions.

Further, in a case where an image is one that is picked up under exposure conditions that suppress the occurrence of halation, the microcomputer 19 records the image data that is obtained by picking up the image, and identification information indicating that the image was picked up under exposure conditions that suppress the occurrence of halation as, for example, an image file on the recording medium 11. By this means, an external image processing apparatus that reads in the image file from the recording medium 11 can perform an appropriate tone conversion with respect to the image that is picked up under the exposure conditions that suppress the occurrence of halation.

According to Embodiment 2 that is configured in this manner, substantially the same advantageous effects as in the foregoing Embodiment 1 can also be achieved in an image pickup apparatus having an image pickup optical system and an image pickup portion.

Further, when picking up an image, since a configuration is adopted that sets exposure conditions in which halation is reduced based on, for example, an ISO speed or a luminance histogram, a decrease in chroma in a high-luminance tone region can be suppressed.

In addition, by recording, together with the image data, identification information that indicates that the relevant image was picked up under exposure conditions that suppress the occurrence of halation, tone conversion processing can be appropriately performed even in an external image processing apparatus.

Note that the respective portions described above may be configured as circuits. Any circuit may be implemented as a single circuit or may be implemented as a combination of a plurality of circuits if the circuit can perform the same function. Further, any circuit is not limited to a circuit configured as a dedicated circuit to perform an intended function, and may be a configuration that performs the intended function by causing a general-purpose circuit to execute a processing program.

Further, although an image processing apparatus and an image pickup apparatus equipped with a function of an image processing apparatus are mainly described in the foregoing description, the present invention may be an image processing method for performing processing that is the same as the processing of the image processing apparatus, an image processing program configured to cause a computer to perform processing that is the same as the processing of the image processing apparatus, or a non-transitory computer-readable recording medium that records the image processing program or the like.

Furthermore, the present invention is not limited to the precise embodiments described above, and can be embodied in the implementing stage by modifying the components without departing from the scope of the invention. Also, various aspects of the invention can be formed by appropriately combining a plurality of the components disclosed in the embodiments described above. For example, some components may be deleted from all of the disclosed components according to the embodiments. Furthermore, components from different embodiments may be appropriately combined. Thus, naturally various modifications and applications are possible within a range that does not deviate from the spirit and scope of the present invention.

What is claimed is:

1. An image processing apparatus, comprising:
   a signal enhancement portion that performs signal enhancement with respect to an input image constituted by pixels having a plurality of color signals, with an intensity that is in accordance with signal values of each pixel, without changing a chroma and a hue; and
   a gamma correction portion that performs, for each pixel, tone conversion of a plurality of color signals that are subjected to signal enhancement by the signal enhancement portion, based on a weak gamma conversion curve in which a degree of gamma enhancement is weaker than in a basic gamma conversion curve which performs conversion such that a signal value of a halftone region at a time of outputting in a case where signal enhancement by the signal enhancement portion is not performed becomes a signal value in an appropriate output value range.

2. The image processing apparatus according to claim 1, wherein the signal enhancement portion calculates a gain with respect to a color signal that takes a largest signal value among a plurality of color signals for each pixel, and performs signal enhancement by applying the gain to all color signals of the pixel.

3. The image processing apparatus according to claim 2, wherein, when a lower limit value of a dynamic range of a color signal is taken as 0, an upper limit value is taken as Cmax, and a signal value of a color signal that takes a largest value among a plurality of color signals for a certain pixel is taken as CM, the signal enhancement portion performs signal enhancement by, with respect to each pixel constituting the input image, applying to all color signals of the certain pixel a gain g that is calculated as follows:

$$g=f(Cin)/Cin$$

by a function f(x) which satisfies the following conditions:

$$f(0)=0$$

$$f(Cmax)=Cmax$$

$$f'(x)>0$$

and which is a function such that f(x)/x monotonously decreases.

4. The image processing apparatus according to claim 3, wherein when the basic gamma conversion curve is expressed as γ0(x), the weak gamma conversion curve is expressed as γ1(x), and an inverse function of the weak gamma conversion curve γ1(x) is expressed as γ1^(−1)(x), the function f(x) is a function that is calculated as:

$$f(x)=\gamma 1\hat{\ }(-1)\cdot \gamma 0(x).$$

5. An image pickup apparatus, comprising:
   an image pickup optical system that forms an object image;
   an image pickup portion that picks up the object image that is formed by the image pickup optical system and generates an image signal; and
   an image processing apparatus according to claim 1 that adopts the image signal that is generated by the image pickup portion as the input image.

6. The image pickup apparatus according to claim 5, further comprising an exposure condition setting portion that, based on the image signal that is outputted from the image pickup portion, calculates appropriate exposure conditions including an exposure time period when the image pickup portion performs an image pickup operation, a diaphragm value of the image pickup optical system, and an ISO speed corresponding to an amplification factor of the image signal that is outputted from the image pickup portion, and sets the appropriate exposure conditions in a case where the ISO speed is less than a predetermined value, and sets exposure conditions in which halation is suppressed more than in the appropriate exposure conditions in a case where the ISO speed is equal to or greater than the predetermined value.

7. The image pickup apparatus according to claim 5, further comprising an exposure condition setting portion that, based on the image signal that is outputted from the image pickup portion, calculates appropriate exposure conditions that include an exposure time period when the image pickup portion performs an image pickup operation and a diaphragm value of the image pickup optical system, and calculates a luminance histogram of an object, and sets the appropriate exposure conditions in a case where it is determined that a proportion of a halation portion of the object that is based on the calculated luminance histogram is less than a predetermined value, and sets exposure conditions in which halation is suppressed more than in the appropriate exposure conditions in a case where it is determined that the proportion of the halation portion of the object is equal to or greater than the predetermined value.

8. An image processing method, comprising:
a signal enhancement step of performing signal enhancement with respect to an input image constituted by pixels having a plurality of color signals, with an intensity that is in accordance with signal values of each pixel, without changing a chroma and a hue; and
a tone conversion step of performing, for each pixel, tone conversion of a plurality of color signals that are subjected to signal enhancement by the signal enhancement step, based on a weak gamma conversion curve in which a degree of gamma enhancement is weaker than in a basic gamma conversion curve which performs conversion such that a signal value of a halftone region at a time of outputting in a case where signal enhancement by the signal enhancement step is not performed becomes a signal value in an appropriate output value range.

9. A non-transitory computer-readable medium storing a computer program configured to cause a computer to execute:
a signal enhancement step of performing signal enhancement with respect to an input image constituted by pixels having a plurality of color signals, with an intensity that is in accordance with signal values of each pixel, without changing a chroma and a hue; and
a tone conversion step of performing, for each pixel, tone conversion of a plurality of color signals that are subjected to signal enhancement by the signal enhancement step, based on a weak gamma conversion curve in which a degree of gamma enhancement is weaker than in a basic gamma conversion curve which performs conversion such that a signal value of a halftone region at a time of outputting in a case where signal enhancement by the signal enhancement step is not performed becomes a signal value in an appropriate output value range.

\* \* \* \* \*

UNITED STATES PATENT AND TRADEMARK OFFICE
CERTIFICATE OF CORRECTION

PATENT NO.        : 9,712,797 B2                              Page 1 of 1
APPLICATION NO.   : 15/147324
DATED             : July 18, 2017
INVENTOR(S)       : Shinya Takasumi It is certified that error appears in the above-identified patent and that said Letters Patent is hereby corrected as shown below:

In the Claims

Claim 3, Column 16, Line 35, please replace:
"is taken as CM, the signal enhancement portion performs"
With:
-- is taken as Cin, the signal enhancement portion performs --

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*